Oct. 23, 1956 W. H. HOGAN 2,767,593

BALL SCREW AND NUT CONSTRUCTION

Filed Jan. 21, 1954

INVENTOR.
WALTER H. HOGAN

BY John A. Ruefer

ATTORNEY

United States Patent Office 2,767,593

Patented Oct. 23, 1956

2,767,593

BALL SCREW AND NUT CONSTRUCTION

Walter H. Hogan, Olmsted Falls, Ohio, assignor to The Cleveland Pneumatic Tool Company, Cleveland, Ohio, a corporation of Ohio Application January 21, 1954, Serial No. 405,311

3 Claims. (Cl. 74—459)

This invention relates broadly to cooperating ball screw and nut elements, but more particularly to such construction wherein the longitudinal travel between the two elements is relatively short.

In the usual ball screw and nut construction, it is necessary to provide a complete circuit for the balls by means of an external return tube or the like which transfers the balls from one to the other end of the nut. This is especially true when the travel of the nut on the screw is relatively long, but in designs wherein the travel is relatively short, longitudinal movement of the balls can be confined within the limits of the nut, thereby eliminating the use of a transfer tube. However, in such cases, the balls must be prevented from accidentally falling off the ends of the nut and must also be maintained in constant contact with one another while enabling them to travel in the usual manner without slippage.

It is therefore an object of this invention to provide a ball screw and nut of relatively short stroke with simple and efficient means for maintaining the balls against each other while permitting them to travel in the usual manner within the confines of the nut.

Another object of this invention is to provide cooperating ball screw and nut elements with novel means adapted to travel back and forth with the balls while maintaining them in operating engagement with one another for limited travel within one of the elements.

Other objects of this invention will be apparent from the following description, wherein similar characters of reference designate corresponding parts, and wherein.

Figure 1:
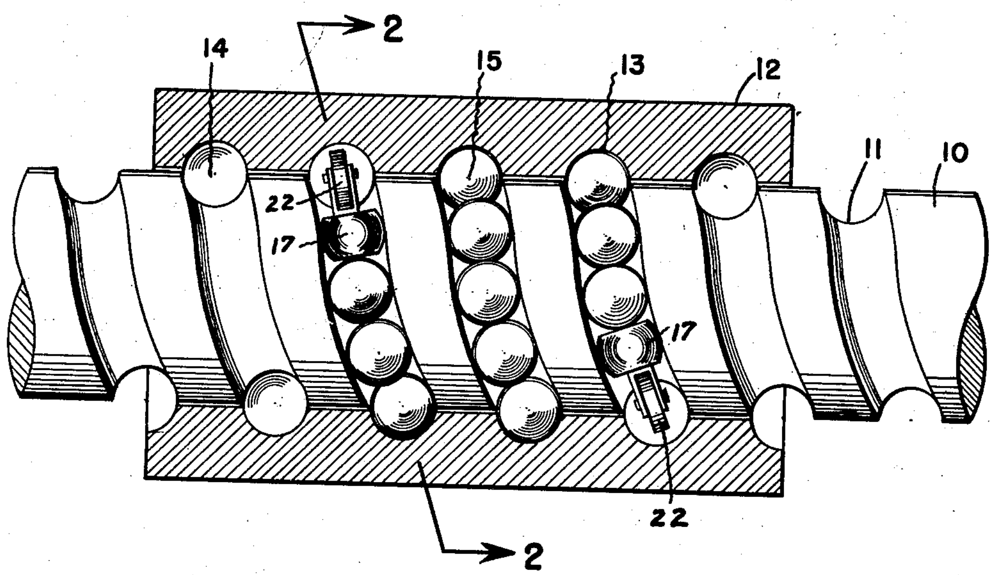
Figure 1 is a longitudinal view, partly in section, of cooperating balls and nut elements embodying the invention.
Figure 3:
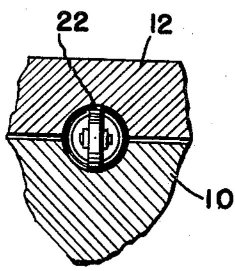
Figure 3 is a sectional view taken on line 3—3 in Figure 2.
Figure 2:
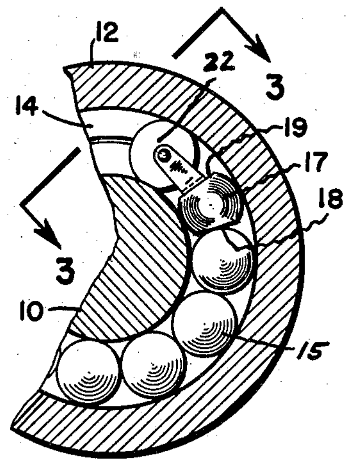
Figure 2 is a partial cross sectional view taken on line 2—2 in Figure 1.
Figure 4:
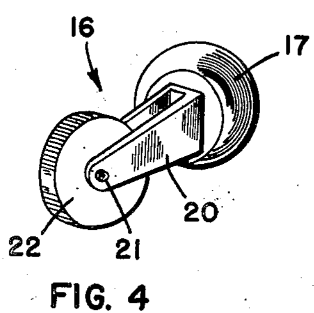
Figure 4 is an enlarged perspective view of one of the novel terminal members shown in Figure 1.

Referring to the drawings, 10 designates a screw element having cut therein a spiral groove 11 of semi-circular cross section. A nut element 12 is mounted on the screw for movement relative thereto, its inner wall being also provided with a spiral groove 13 corresponding to groove 11 and forming therewith a spiral channel 14 of circular cross section which extends from one to the other end of the nut 12. As usual in this type of construction, there is provided within the channel 14 a plurality of balls 15, which generally entirely fill the channel and are transferred from one to the other end thereof through a transfer tube or the like. In the present construction, that is where relative longitudinal travel of the screw and nut is small, the balls 15 may fall short of the ends of the channel sufficiently to enable this relative longitudinal movement of the screw and nut elements without danger of the balls reaching the ends of the channel. In order to maintain the balls against each other as well as preventing them from accidentally dropping off the nut through the open ends of the channel, there is provided at each end of the group of balls 15 a group terminal or ball stop-pusher 16 comprising a ball 17 formed with two opposed flat surfaces 18 and 19. Surface 18 acts as a pushing surface against the last ball 15 of the group, while the surface 19 acts as a small yoke 20 fixed thereto by any suitable means, not shown. Carried by the free end of the yoke 20, there is a cross pin 21 having rotatably mounted thereon, between the arms of the yoke, a small wheel 22 preferably made of elastomeric compound. This wheel is relatively narrow and of a diameter calculated to fit tightly into the channel 14 in frictional engagement with the bottoms of grooves 11 and 13. Preferably, it is slightly compressed in the channel 14 to assure traction of the wheel with the elements 10 and 12.

In the operation of the device, the terminals 16 are inserted into the channel 14 from the opposite ends of the nut element 12 and are pushed toward each other until the balls 15 are contacting one another. Care must be exercised to equally space the terminals 16 from the ends of the nut element 12 with the nut located in a neutral position, that is half the length of its intended travel on the screw element 10. Upon relative rotation of the screw and nut elements 10 and 12 respectively, rotation in the same direction is imparted to the wheels 22 causing them to travel within the channel 14 in the same direction and at the same rate of speed as the balls 15. As the wheels 22 travel within the channel 14, they carry with them the yokes 20 and the balls 17, thereby maintaining a constant distance between the terminal balls 17 and consequently assuring contact of the balls 15 with one another.

It is to be understood that the above described device is to be used only with cooperating screw and nut elements wherein movement of one element relative to the other, such as the nut on the screw, is sufficiently limited to prevent either wheel from reaching the ends of the channel 14.

It will also be understood that the wheels 22 may be made of any elastomeric compound such as rubber or the like which when under slight compression is capable of providing traction between the wheels and the bottoms of the grooves 11 and 13.

While the preferred form of the invention has been shown and described, it will be understood that variation in detail and form may be made without departure from the spirit and scope of the invention as herein claimed.

I claim:

1. In a device of the character described, screw and nut cooperating elements one adapted to rotate relative to the other, complementary helical grooves within said elements defining a helical channel therebetween, a group of interengaged balls within said channel operatively interconnecting said elements, said group of balls movable lengthwise of said channel upon rotation of said one element, and means retaining said balls within said channel including a rotatable member at each end of said group retained there by frictional engagement with the walls of said grooves and rotated for movement with said balls by virtue of said frictional engagement upon rotation of said one element.

2. In a device of the character described, screw and nut cooperating elements one adapted to rotate relative to the other, complementary helical grooves within said elements defining a helical channel therebetween, a group of balls within said channel operatively interconnecting said elements and driven lengthwise of said channel upon rotation of said one element, terminal members engaging the end balls of said group including wheel members having traction with the bottoms of said grooves for rotation therebetween to impart movement to said terminal members with said balls upon rotation of said one element.

3. In a device of the character described, screw and nut cooperating elements one adapted to rotate relative to the other, complementary helical grooves within said elements defining a helical channel therebetween, a group of balls within said channel operatively interconnecting said elements and driven lengthwise of said channel upon rotation of said one element, terminal members engaging the end balls of the said group including resilient wheel members diametrically compressed within said channels for traction with the bottoms of said grooves and rotation therebetween to drive said terminal lengthwise of said channel upon rotation of said one element.

References Cited in the file of this patent

UNITED STATES PATENTS

| | | |
|---|---|---|
| 1,905,039 | McKellar | Apr. 25, 1933 |

FOREIGN PATENTS

| | | |
|---|---|---|
| 559,407 | Great Britain | Feb. 17, 1944 |